(12) United States Patent
Guo et al.

(10) Patent No.: US 9,087,339 B2
(45) Date of Patent: Jul. 21, 2015

(54) CONTENT PERFORMANCE ESTIMATION (75) Inventors: Xiaofeng Guo, Mountain View, CA (US); Tong Liu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 177 days.

(21) Appl. No.: 13/510,063

(22) PCT Filed: Nov. 19, 2009

(86) PCT No.: PCT/CN2009/001281
§ 371 (c)(1),
(2), (4) Date: Jun. 6, 2012

(87) PCT Pub. No.: WO2011/060564
PCT Pub. Date: May 26, 2011

(65) Prior Publication Data
US 2012/0239492 A1    Sep. 20, 2012

(51) Int. Cl.
*G06Q 30/00* (2012.01)
*G06Q 30/02* (2012.01)

(52) U.S. Cl.
CPC ............ *G06Q 30/02* (2013.01); *G06Q 30/0243* (2013.01); *G06Q 30/0244* (2013.01)

(58) Field of Classification Search
CPC ....................... G06Q 30/0243; G06Q 30/0244
USPC ........................................... 705/14.42, 14.43
See application file for complete search history.

(56) References Cited

U.S. PATENT DOCUMENTS

| | | | | |
|---|---|---|---|---|
| 5,848,396 | A * | 12/1998 | Gerace | 705/7.33 |
| 6,665,653 | B1 * | 12/2003 | Heckerman et al. | 706/47 |
| 2001/0020236 | A1 * | 9/2001 | Cannon | 707/1 |
| 2002/0069105 | A1 * | 6/2002 | do Rosario Botelho et al. | 705/14 |
| 2002/0099605 | A1 * | 7/2002 | Weitzman et al. | 705/14 |
| 2003/0018659 | A1 * | 1/2003 | Fuks et al. | 707/500 |
| 2004/0006478 | A1 * | 1/2004 | Alpdemir et al. | 704/275 |

(Continued)

FOREIGN PATENT DOCUMENTS

| | | |
|---|---|---|
| CN | 101146260 | 3/2008 |
| CN | 101431524 | 5/2009 |
| WO | WO2009023734 A1 | 2/2009 |

OTHER PUBLICATIONS

Trademark Electronic Search System (Tess), Javascript, Oct. 10, 2013, United States Patent and Trademark Office.*

(Continued)

*Primary Examiner* — John G Weiss
*Assistant Examiner* — Kiersten Summers
(74) *Attorney, Agent, or Firm* — Fish & Richardson P.C.

(57) ABSTRACT

Methods, systems, and apparatus, including computer programs encoded on a computer storage medium, are provided for computing performance estimates. Performance estimates are provided for resources based on candidate targeting criteria included in requests for the performance estimates. The performance estimates are computed based on previously received resource requests that are included in a relevant request group. The relevant request group is defined to include resource requests that include request criteria that match reference targeting criteria. The request criteria can include data characterizing a user for which the resource is being selected. In some implementations, request groups can be defined by analyzing previously-received resource requests and including the resource requests in request groups having reference targeting criteria that are matched by the request criteria.

18 Claims, 5 Drawing Sheets

(56) References Cited

U.S. PATENT DOCUMENTS

| | | | |
|---|---|---|---|
| 2005/0256766 A1* | 11/2005 | Garcia et al. | 705/14 |
| 2008/0082415 A1* | 4/2008 | Shastry | 705/14 |
| 2008/0167957 A1* | 7/2008 | Steelberg et al. | 705/14 |
| 2008/0270223 A1* | 10/2008 | Collins et al. | 705/10 |
| 2009/0037267 A1* | 2/2009 | Duggal et al. | 705/14 |
| 2009/0132346 A1* | 5/2009 | Duggal et al. | 705/10 |
| 2010/0082425 A1* | 4/2010 | Yang | 705/14.46 |

OTHER PUBLICATIONS

Notification of Transmittal of the International Search Report and the Written Opinion of the International Search Report and the Written Opinion of the International Searching Authority, or the Declaration, for PCT/CN2009/001281 dated Sep. 2, 2010, 9 pages.

Office Action in Australian Application No. 2009355571, mailed Jul. 1, 2014, 3 pages.

* cited by examiner

CONTENT PERFORMANCE ESTIMATION

CROSS REFERENCE TO RELATED APPLICATIONS

This application is a §371 National Stage Application and claims priority to International Application No. PCT/CN2009/001281, filed Nov. 19, 2009, which is incorporated herein by reference in its entirety.

BACKGROUND

This specification relates to data processing techniques such as servicing requests for content.

The Internet enables access to a wide variety of resources. For example, video, audio, webpages directed to particular subject matter, news articles, images, and other resources are accessible over the Internet. The wide variety of resources that are accessible over the Internet has enabled opportunities for advertisers to provide targeted advertisements with the resources. For example, an advertisement can be targeted for presentation with resources directed to subject matter to which the advertisement is relevant and to users that are members of a target audience for the advertisement.

Targeting criteria can be associated with an advertisement to facilitate targeting of the advertisement to users that are members of the target audience for the advertisement. For example, an advertisement for basketballs being sold by a sporting goods store can be associated with the targeting keyword "basketball" and demographic targeting criteria specifying that the advertisement is to be presented to users that are identified to be between 12 and 25 years of age. In turn, when a user satisfying the demographic targeting criteria requests a search results webpage including search results for the search query "basketball," the advertisement can be presented with the search results page. Similarly, the advertisement can be presented with another resource that is relevant to targeting keywords associated with the advertisement and requested by a user that satisfies the demographic targeting criteria.

There are many different targeting criteria that an advertiser can associate with an advertisement for targeting the advertisement. Typically, as an advertiser provides more specific targeting criteria, the precision with which an advertisement is presented to a target audience increases. However, as the specificity of the targeting criteria increases the reach of the advertisement is reduced because fewer users will match the targeting criteria specified by the advertiser.

To assist advertisers in determining which targeting criteria to associate with their advertisements, advertising systems may provide performance estimates for the advertisement based on targeting criteria specified by the advertisers. For example, an advertiser can select different combinations of targeting criteria for the advertisement and receive an indication of a number of impressions that the advertisement will likely receive if targeted according to the targeting criteria. However, as the data used to compute the performance estimates increases, the time required to compute performance estimates can increase. Therefore, the ability to provide the performance estimates to advertisers in a real-time interactive system may be reduced.

SUMMARY

In general, one aspect of the described subject matter can be implemented in methods that begin by accessing, from a request log, resource requests that specify request criteria with which targeted resources responsive to the resource request are selected. The accessed resource requests are segmented into request groups based on the specified request criteria, where each request group requires each resource request in the request group to specify a request criterion that matches a reference targeting criterion for the request group. A performance estimate request that requests a measure of predicted performance of a resource targeted according to one or more candidate targeting criteria is received. The one or more candidate targeting criteria can specify request criteria of resource requests for which the resource is eligible for selection. In response to the performance estimate request, a performance estimate is computed based on a request group having a reference targeting criterion that matches a candidate targeting criterion from the one or more candidate targeting criteria. In turn, the performance estimate is provided in response to the performance estimate request. Other implementations of this aspect include corresponding systems, apparatus, and computer programs, configured to perform the actions of the methods, encoded on computer storage devices.

Implementations may include one or more of the following features. For example, segmenting the resource requests into request groups can be performed by selecting attributes with which the resource requests are to be segmented, with each of the attributes corresponding to attribute values specified by the resource requests. For each attribute, one or more reference targeting criteria with which request groups are to be defined are selected, where the one or more reference targeting criteria for each request group specify one or more attribute values that are required to be specified by resource requests for the resource requests to be included in the request group. For each resource request, request groups having reference targeting criteria that match attribute values specified by the resource request are identified. The resource request is included in the identified request groups.

A performance estimate can be computed by selecting a request group having a reference targeting criterion that matches a candidate targeting criterion for the performance estimate request; selecting resource requests within the selected request group that specify request criteria matching all of the candidate targeting criteria; and computing the performance estimate based on the identified resource requests that specify request criteria matching all of the candidate targeting criteria.

Accessing the resource requests can include accessing advertisement requests, with each advertisement request specifying attribute values with which targeted advertisements are selected for presentation to a user device for which the advertisement request was received. The attribute values can specify values for demographic data for a user. Receiving a performance estimate request can include receiving, from an advertiser, a request for an advertisement performance measure specifying a predicted number of impressions for an advertisement targeted according to the candidate targeting criteria.

The resource requests can be segmented by receiving reference targeting criteria with which the resource requests are to be segmented; identifying, for each resource request, request criteria that correspond to the reference targeting criteria; and including resource requests in a first request group that only requires each resource request in the first request group to have a first request criterion corresponding to a first reference targeting criterion that matches a first group specific targeting value for the first reference targeting criterion.

Particular implementations can realize one or more of the following advantages. Performance estimates can be computed based only on resource requests that are included in a relevant request group to reduce processing resources required to compute the estimates. Performance estimate accuracy can be improved when computed using sampling techniques for resource requests that are included in the relevant request group. Relevant request groups are defined to include only resource requests that match reference targeting criteria to enable more efficient computation of performance estimates for candidate targeting criteria.

The details of one or more implementations are set forth in the accompanying drawings and the description below. Other features and advantages will be apparent from the description, the drawings, and the claims.

BRIEF DESCRIPTION OF THE DRAWINGS

Like reference numbers and designations in the various drawings indicate like elements.

DETAILED DESCRIPTION

An analysis subsystem provides performance estimates for resources based on candidate targeting criteria included in requests for the performance estimates. The analysis subsystem computes the performance estimate based on previously received resource requests that are included in a relevant request group. The relevant request group is defined to include only resource requests that include request criteria that match reference targeting criteria. The request criteria are data that can be used for selecting a resource for presentation in response to a resource request. The request criteria can include data characterizing a user for which the resource is being selected. In some implementations, the analysis subsystem can define request groups by analyzing previously-received resource requests and including the resource requests in request groups having reference targeting criteria that are matched by the request criteria.

The analysis subsystem is described throughout this document as a subsystem for an advertisement management system and in reference to providing performance estimates for advertisements based on candidate targeting criteria for the advertisements. However, the analysis subsystem can also be implemented to provide performance estimates for other resources and with other processing systems.

Figure 1:
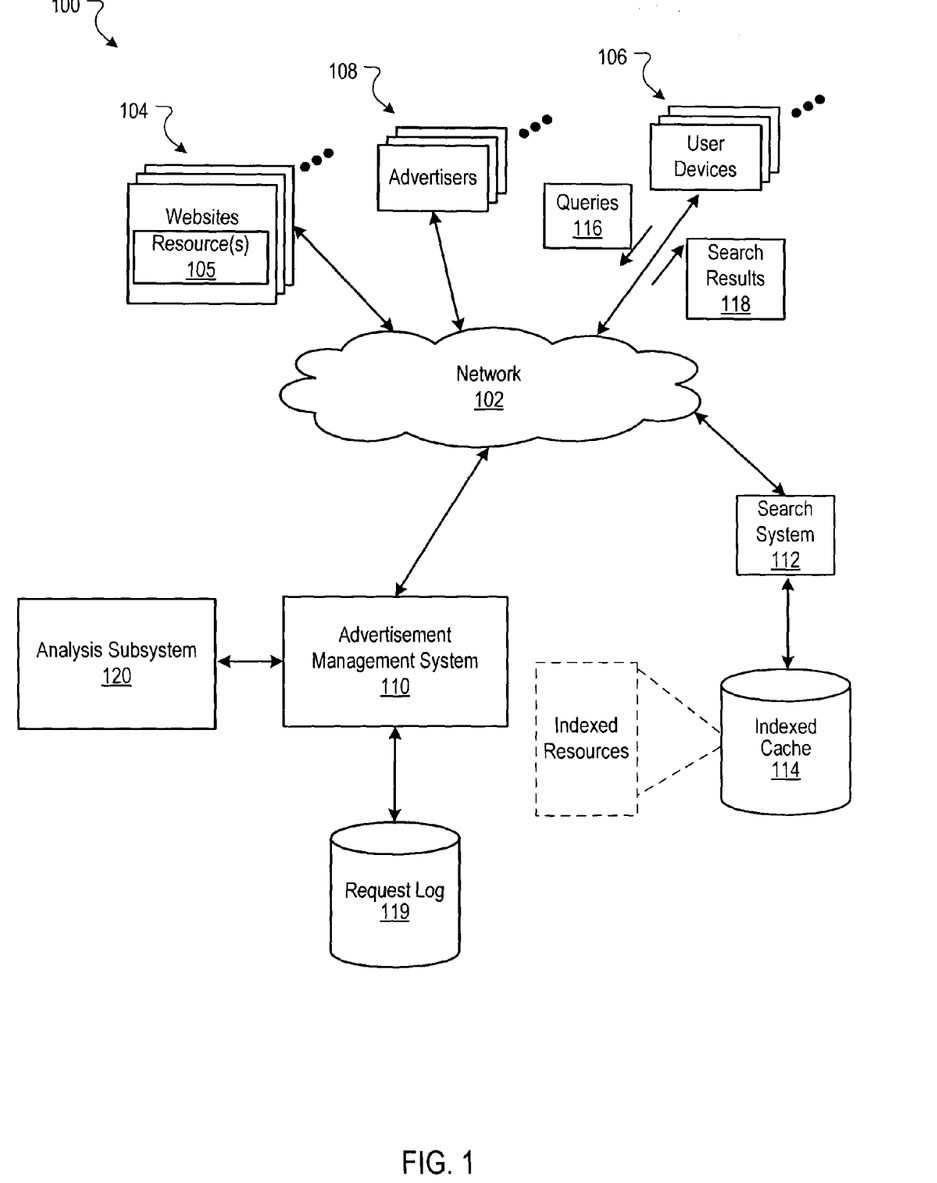
FIG. 1 is a block diagram of an example environment in which an advertisement management system manages advertising services.

FIG. 1 is a block diagram of an example environment 100 in which an advertisement management system 110 manages advertising services. The example environment 100 includes a network 102 such as a local area network (LAN), wide area network (WAN), the Internet, or a combination thereof. The network 102 connects websites 104, user devices 106, advertisers 108, and the advertisement management system 110.

The example environment 100 may include many thousands of websites 104, user devices 106, and advertisers 108.

A website 104 includes one or more resources 105 associated with a domain name and hosted by one or more servers. An example website is a collection of webpages formatted in hypertext markup language (HTML) that can contain text, images, multimedia content, and programming elements, e.g., scripts. Each website 104 is maintained by a publisher, e.g., an entity that manages and/or owns the website 104.

A resource 105 is any data that can be provided by the website 104 over the network 102 and that is associated with a resource address. Resources include HTML pages, word processing documents, portable document format (PDF) documents, images, video, and feed sources, to name only a few. The resources can include content, e.g., words, phrases, images and sounds, that may include embedded information (such as meta-information in hyperlinks) and/or embedded instructions (such as scripts). Advertisement resources can be provided with other resources, for example, in response to an advertisement request corresponding to a request for the other resource.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window) in which advertisements can be presented. These specified portions of the resource or user display are referred to as advertisement slots.

To facilitate searching of these resources, a search system 112 identifies the resources by crawling and indexing the resources provided by the publishers on the websites 104. Data about the resources can be indexed based on the resource to which the data corresponds. The indexed and, optionally, cached copies of the resources are stored in an indexed cache 114.

User devices 106 submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages.

A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results are requested by a user device 106, the advertisement management system 110 receives a request for advertisements to be provided with the resource or search results ("advertisement request"). An advertisement request can include characteristics of the advertisement slots that are defined for a resource or search results page with which requested advertisements will be presented.

For example, a reference (e.g., URL) to the resource for which the advertisement slot is defined, a size of the advertisement slot, and/or media types that are available for presentation in the advertisement slot can be provided to the advertisement management system 110. Similarly, keywords for a requested resource or a search query 116 for which search results are requested can also be provided to the advertisement management system 110 to facilitate identification of advertisements to be presented with the requested resource or search results page.

A keyword is text that indicates a topic for which a resource is identified as relevant. A publisher of the resource can explicitly associate keywords with a resource that are indicative of topics to which the resource is relevant. Additionally, keywords can be associated with a resource based on an analysis of the content of the resource. For example, text that is included in the resource can be input to a clustering system that identifies topic clusters to which the text is relevant. In turn, the topics associated with the topic clusters can be assigned as keywords for the resource.

An advertisement request can also include or specify request criteria that can be used for selecting advertisements (e.g., targeted advertisements). For example, the request criteria can include data characterizing a user that is requesting a resource with which advertisements will be provided. The request criteria can include, for example demographic information and geographic information associated with the user that is requesting content. Demographic information can include gender, age, income classification, occupation, marital status, familial status, among other information. The geographic information can include a country, state, or other location information (e.g., city) corresponding to the location of the user to which the advertisement will be presented. Throughout this document, location and demographic information are used as examples, though any request criteria or other information that can be used for selecting resources can be used.

In response to the advertisement request, the advertisement management system 110 can select, for presentation, advertisements having characteristics matching the characteristics of advertisement slots and also have targeting criteria matching the data provided with the advertisement request. Thus, the targeting criteria that are associated with an advertisement can directly affect a number of times that the advertisement is presented with resources.

For example, assume that an advertisement request including the resource keyword "basketball" and request criteria indicating that the user requesting the resource is 18 years old is received. In response to this advertisement request, a first advertisement having a targeting keyword "basketball" and associated with age targeting criteria "18-25" is eligible for presentation, whereas another advertisement having the same targeting keyword, but associated with the age targeting criteria 12-17 may not be eligible for presentation. Thus, if more advertisement requests are received for users between the ages of 18-25 than users between the ages of 12-17, the first advertisement will be eligible for presentation more often than the other advertisement.

If the advertisement associated with the age targeting criteria 12-17 is not receiving the number of presentations (i.e., impressions) desired by the advertiser, the advertiser can adjust the targeting criteria to attempt to obtain more advertisement presentations. For example, the advertiser may adjust the age targeting criteria to include 12-17 and 18-25 and/or other age ranges so that the advertisement is eligible for presentation to a larger group of users. However, the increase in the number of presentations realized by adjusting the targeting criteria may exceed the number of presentations desired by the advertiser, and may cause the advertiser to spend more money on advertising than it originally planned. Thus, the advertiser may desire to know the impact on advertisement performance that is expected to result from changes to the targeting criteria for the advertisement in advance of changing the targeting criteria.

The advertisement management system 110 includes an analysis subsystem 120 to analyze advertisement requests (or other resource requests) and provide advertisement performance estimates. Performance estimates are measures of predicted performance of resources. A performance estimate can be computed by analyzing historical performance measures (e.g., using statistical analysis) and providing the performance estimate based on this analysis.

In some implementations, the analysis subsystem 120 includes one or more processors configured to provide performance estimates for an advertisement based on candidate targeting criteria specified in a performance estimate request. For example, the analysis subsystem 120 can receive a performance estimate request for an advertisement targeted to male users from Chicago. In response to the performance estimate request, the analysis subsystem 120 can analyze previous advertisement requests to compute a number of impressions, clicks, conversions, and/or other measures of performance that the advertiser can expect for the advertisement when targeted to males from Chicago.

The performance estimate can be computed, for example, as a function of the number of previously-received advertisement requests that are stored in the request log 119 and correspond to an advertisement request for a male user located in Chicago. For example, the analysis subsystem 120 can analyze each of the previous advertisement requests to determine a monthly (weekly, daily, or hourly) average number of requests for advertisements being presented to male users located in Chicago. In turn, a performance estimate specifying, for example, the average number of advertisement requests (or a function of the average number of advertisement requests) can be provided to an advertiser from which the performance estimate request was received.

In some implementations, performance estimates are provided in substantially real-time through an interactive process with the advertiser. For example, an advertiser can access a performance estimate user interface that enables the advertiser to specify candidate targeting criteria and receive performance estimates. In these implementations, the advertiser can iteratively adjust the candidate targeting criteria until the analysis subsystem 120 provides a performance estimate that satisfies the advertiser's advertising goals.

For example, an advertiser that desires an advertisement to be presented approximately 100,000 times in a month can adjust the candidate targeting criteria until the performance estimate for the advertisement is near 100,000 impressions. The advertiser can then specify the candidate targeting criteria that provide the desired performance estimate as the targeting criteria for selection of the advertisement for presentation.

As the number of advertisement requests stored in the request log 119 increases, the time required to analyze each of the requests increases, thereby increasing the time required to provide performance estimates to advertisers. Because advertisers often request performance estimates as part of an iterative process to identify targeting criteria that result in a desired performance estimate, a time constraint can be imposed for providing the performance estimates. For example, the time constraint can require that the analysis subsystem 120 provide performance estimates within one second of receiving the request for performance estimates. This example time constraint is provided for illustrative purposes; other time constraints can be imposed, for example, based on available processing resources and performance goals of an entity providing the performance estimates.

The time required to provide the performance estimates can be reduced, for example, by providing estimates that are based only on a sampling of the advertisement requests that are stored in the request log 119. For example, in response to a performance estimate request, a random sampling of advertisement requests can be analyzed and a performance estimate can be statistically derived based on the analyzed portion of the advertisement requests. However, as the number of advertisement requests continues to increase, the sample used to compute a performance estimate becomes a smaller percentage of the total advertisement requests in the request log 119, and thus becomes a less statistically relevant sample. In turn, the accuracy of the performance estimates may also be reduced.

The analysis subsystem 120 can be implemented to provide performance estimates within a time constraint by computing the performance estimates based on an analysis of advertisement requests that are identified as relevant to the computation of the performance estimate. In some implementations, the analysis subsystem 120 can compute performance estimates based on advertisement request groups that match one or more of the candidate targeting criteria specified in the performance estimate requests, which may be referred to as relevant advertisement request groups.

For example, in response to receiving a performance estimate request for an advertisement targeted to a male from Chicago, the analysis subsystem can identify a relevant advertisement request group for computing a performance estimate. The relevant advertisement request group can be an advertisement request group including advertisement requests that requested, for example, advertisements for users in Chicago. In turn, the analysis subsystem 120 can compute the performance estimate based on the advertisement requests in the relevant advertisement request group. Thus, in these implementations, the analysis subsystem 120 can provide performance estimates without analyzing every advertisement request in the request log 119, thereby reducing the time required to provide performance estimates. Providing performance estimates based on relevant advertisement request groups is described in more detail with reference to FIGS. 3 and 4.

In some implementations, the analysis subsystem 120 defines advertisement request groups such that each advertisement request group includes advertisement requests that each match one or more reference targeting criteria. In these implementations, the analysis subsystem 120 can define the advertisement request groups by segmenting the advertisement requests in the request log 119 based on reference targeting criteria.

For example, the advertisement requests can be segmented based on reference targeting criteria specifying values for the age and location of users for which the advertisement request was received. The analysis subsystem 120 analyzes the advertisement requests in the log 119 and defines the advertisement request groups so that each group includes advertisement requests having a same value for at least one of the reference targeting criteria. For example, advertisement requests requesting advertisements for presentation to users from Chicago can be included in an advertisement request group that is defined to include advertisement requests corresponding to users from Chicago. Defining advertisement request groups is described in more detail with reference to FIGS. 2, 3A-3D and 6.

Figure 2:
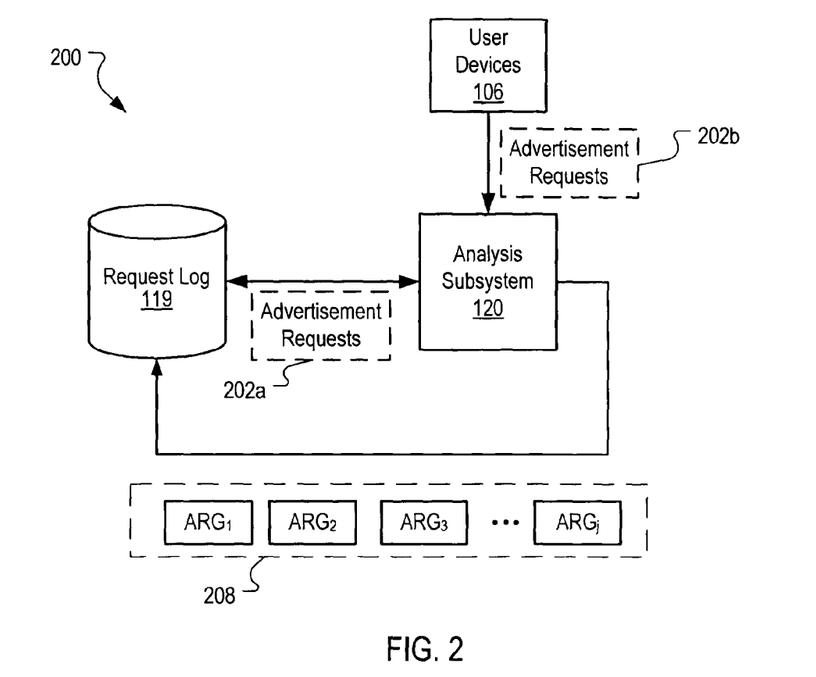
FIG. 2 is a block diagram of example data flows for defining advertisement request groups.

FIG. 2 is a block diagram 200 of example data flows for defining advertisement request groups. The analysis subsystem 120 receives advertisement requests 202 as input. The analysis subsystem 120 receives the advertisement requests 202a, for example, from a data store storing previously received advertisement requests, such as the request log 119. In some implementations, the analysis subsystem 120 can receive new advertisement requests 202b provided by user devices 106 prior to the new advertisement requests 202b being stored in the request log 119. In some implementations, advertisement request groups are initially defined using the advertisement requests 202a from the request log 119 and, in turn periodically updated to include the new advertisement requests 202b.

In some implementations, the analysis subsystem 120 segments advertisement requests 202 based on reference targeting criteria and stores advertisement request groups that result from the segmenting in the request log 119. For example, based on one or more reference targeting criteria (e.g., age and location), the analysis subsystem 120 can define multiple advertisements request groups 208, with each advertisement request group ARG1-ARGj corresponding to unique combinations of reference targeting criteria (e.g., age=18, location=Chicago) to which the advertisement requests belong. In a particular example, ARG1 can be defined for advertisement requests corresponding to users that are 18 years old, irrespective of the location of the users, while ARG2 can be defined for advertisement requests corresponding to users that are 18 years old and from Chicago. Similarly, the remaining advertisement request groups ARG3-ARGj can be defined to include advertisement requests having other unique combinations of request criteria values that match reference targeting criteria. The analysis subsystem 120 can create an index of advertisement request groups 204 and the respective advertisement requests that correspond to each advertisement request group in a data store, such as the request log 119.

The reference targeting criteria with which advertisement request groups are defined can be selected, for example, based on rates at which advertisers specify specific targeting criteria, rates at which advertisement requests include specific request criteria, or other measures of popularity for specific criteria. For example, if a large portion of advertisement requests (e.g., greater than 50% of all advertisement requests) include data specifying a location of the user for which the advertisements are being requested, using the location of the user as a reference targeting criteria will facilitate inclusion of a large portion of the advertisement requests in an advertisement request group based on the location provided.

Additionally, the reference targeting criteria can be selected, for example, based on the ability to delineate the advertisement requests according to a specified distribution or so that each advertisement request group includes less than a maximum number of advertisement requests. Age is an example of a reference targeting criterion that can be used to delineate advertisement requests into a many different advertisement request groups because user ages span a substantially continuous range of values, and advertisement requests can be delineated according to age to achieve a specified distribution among the advertisement request groups.

For example, each advertisement request group can be defined to include advertisement requests for users within a specified age range, where each age range is selected so that each advertisement request group will include a similar number of advertisement requests (e.g., 100,000), or so that the distribution of advertisement requests in the advertisement request groups satisfies a specified (e.g., normal or bimodal) distribution. Several examples of reference targeting criteria are presented, but others can be selected and used, for example, to achieve specific performance goals (e.g., computation speed or computation accuracy).

FIGS. 3A-3D are charts of example advertisement request groups defined based on reference targeting criteria. Defining advertisement request groups is described with reference to each advertisement request being analyzed individually, but multiple advertisement requests can be analyzed in parallel, for example, using multiple processing threads or analysis subsystems.

For purposes of this example, assume that four advertisement requests A-D are available for defining advertisement request groups with age and location being the reference targeting criteria with which the advertisement request groups are to be defined. Table 1 provides a summary of the request criteria that are received with each of the respective advertisement requests.

TABLE 1

| Advertisement Request | Age | Location | Gender | Interests |
|---|---|---|---|---|
| A | 18 | New York | Female | N/A |
| B | N/A | California | N/A | Sports |
| C | N/A | N/A | Male | N/A |
| D | 20 | New York | Male | Shopping |

The analysis subsystem can analyze each request to identify advertisement request groups in which the advertisement request can be included. In some implementations, an advertisement request can be included in an advertisement request group only if the advertisement request includes each of the targeting criteria values for which the advertisement request groups is defined. For example, one advertisement request group can be defined to include advertisement requests that have a specified value for only one reference targeting criteria (e.g., age=18, location=∀, where ∀ represents any value, including a null value), while another advertisement request group can be defined to include advertisement requests that have a specified value for two or more of the reference targeting criteria (e.g., age=18 and location=New York). Additionally, an advertisement request group can be defined to include each advertisement request irrespective of the reference targeting criteria (e.g., age=∀ and location=∀) that can be used, for example, when no candidate targeting criteria match the reference targeting criteria, as described below.

In some implementations, the reference targeting criteria with which advertisement request groups are defined are specified prior to analysis of the advertisement requests. In other implementations, the reference targeting criteria with which the advertisement request groups are defined are determined based on the request criteria included in the advertisement requests, as described below.

Figure 3A:
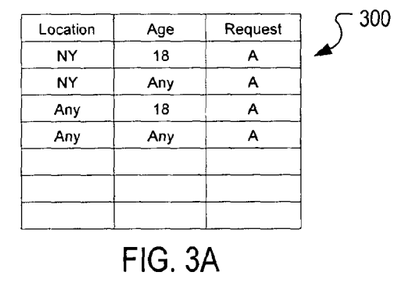
FIGS. 3A-3D are charts of example sets advertisement request groups defined based on reference targeting criteria.

The analysis subsystem can analyze request A to determine advertisement request groups in which request A can be included. For example, the analysis subsystem can determine that request A specifies the request criteria age=18 and location=New York. Therefore, request A can be included in an advertisement request group defined for advertisement requests that are received from 18 year olds from New York (i.e., reference targeting criteria age=18 and location =New York). Additionally, request A can be included in an advertisement request group that only requires an advertisement request to specify an age of 18 (i.e., reference targeting criteria age=18 and location =∀), or an advertisement request group that only requires a location of New York (i.e., reference targeting criteria age=∀ and location=New York). Further, request A can be included in an advertisement request group that does not require a specific value for either of the reference targeting criteria (i.e., reference targeting criteria age=∀ and location=∀). FIG. 3A provides an example illustration 300 of advertisement request groups as defined following analysis of request A.

Figure 3B:
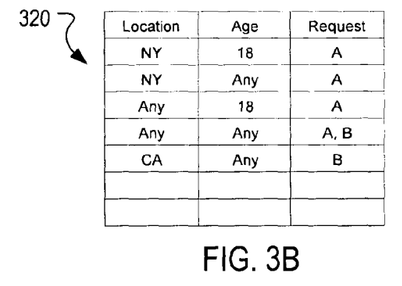

Request B can be analyzed and included in advertisement request groups in a manner similar to that described above. For example, request B includes request criteria specifying that the user is located in California and has interests in sports. In this example, age and location are the only reference targeting criteria with which advertisement request groups are being defined. Therefore, based on the request criteria available, request B can be included in an advertisement request group that only requires a location of California (i.e., age=∀ and location=California). Request B can also be included in the advertisement request group that does not require a specific value for either of the reference targeting criteria (i.e., age=∀ and location=∀). FIG. 3B provides an example illustration 320 of advertisement request groups as defined following analysis of request B.

Figure 3C:
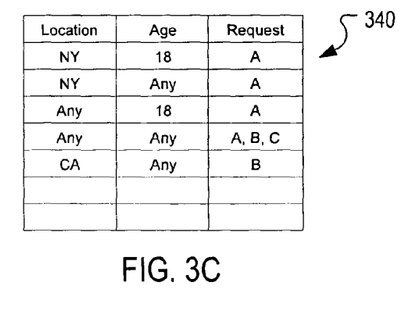

Requests C and D can also be analyzed and included in advertisement request groups, as described above. Because request C does not include request criteria specifying values for either of the reference targeting criteria (i.e., age or location), it can only be included in an advertisement request group that does not require a specific value for either of the reference targeting criteria (i.e., age=∀ and location=∀). FIG. 3C provides an example illustration 340 of advertisement request groups as defined following analysis of request C.

Figure 3D:
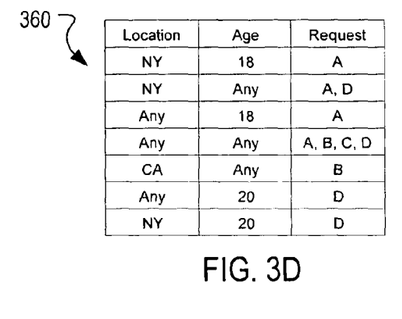

Request D has request criteria specifying a value of 20 for age and a value of New York for location. Therefore, request D can be included in an advertisement request group that requires an age value of 20 and a location value of New York (i.e., reference targeting criteria age=20 and location=New York), an advertisement request group that requires only a location of New York (i.e., reference targeting criteria age=20 and location=∀), and the advertisement request group that does not require a specific value for either of the reference targeting criteria (i.e., reference targeting criteria age=∀ and location=∀). FIG. 3D provides an example illustration 360 of advertisement request groups as defined following analysis of request D.

The analysis of advertisement requests can continue for additional advertisement requests and definition of advertisement request groups can continue to be defined and/or updated based on the additional advertisement requests. The additional advertisement requests can be previously received advertisement requests that are available in a data store, such as the request log 119 of FIG. 1, or new advertisement requests that are received from user devices. Analysis of additional advertisement requests and updates to the advertisement request groups can be continually performed as additional advertisement requests are received, or periodically performed according to an analysis schedule.

The advertisement request groups that are defined as described above can each include tens of thousands or hundreds of thousands of advertisement requests. In some implementations, a maximum number of advertisement requests can be specified for each advertisement request group so that performance estimates are provided within the time constraint for providing performance results. Once the number of advertisement requests exceeds the maximum number of advertisement requests, sampling techniques can be used, as described above. Using sampling techniques with the advertisement request groups can provide better performance estimates than using sampling techniques with all of the advertisement requests because the samples are being selected from advertisement request group that is relevant to the performance estimate.

Once advertisement request groups have been defined, the advertisement request groups can be used to compute performance estimates based on candidate targeting criteria.

Figure 4:
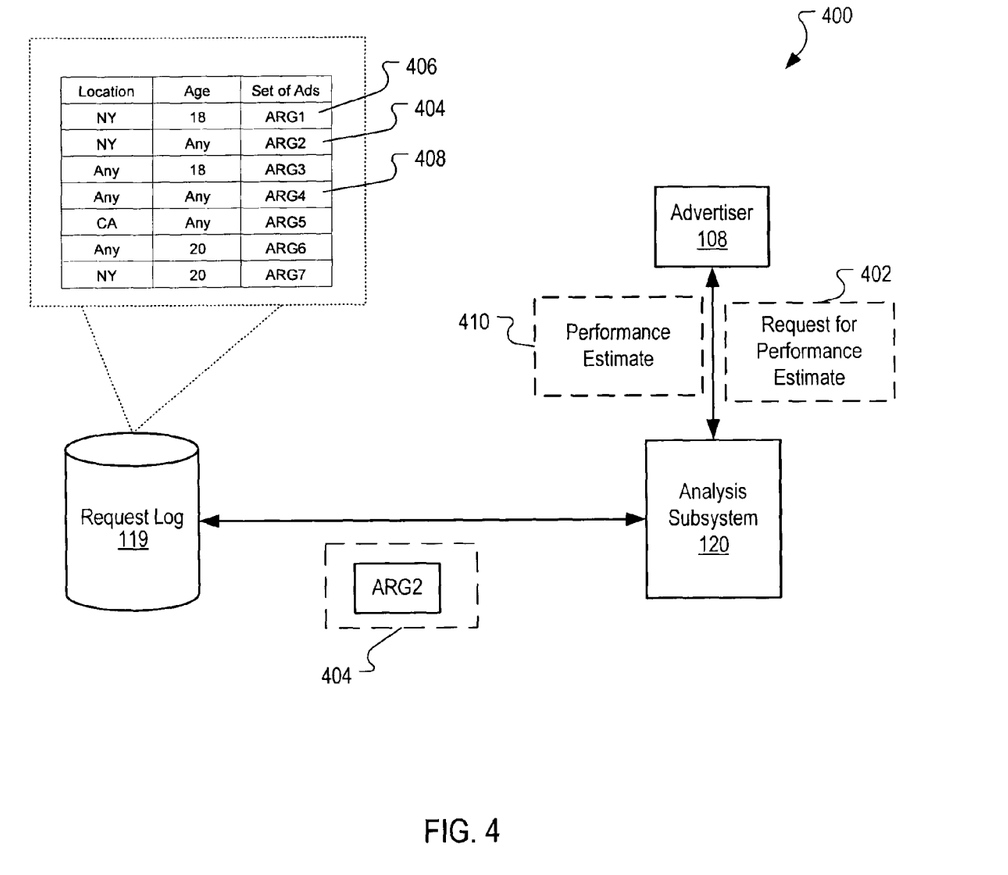
FIG. 4 is a block diagram of example data flows for computing performance estimates based on advertisement request groups.

FIG. 4 is a block diagram 400 of example data flows for computing performance estimates based on advertisement request groups. The analysis subsystem 120 receives a performance estimate request 402 as input from, for example, an advertiser 108.

The performance estimate request 402 includes one or more candidate targeting criteria for which a performance estimate is to be provided. For example, an advertiser 108 can request a performance estimate for an advertisement that is targeted to 19 year old males from New York. In this example, the analysis subsystem 120 can identify the candidate targeting criteria from the performance estimate request and determine an advertisement request group from available advertisement request groups (ARG1-ARG7) that best matches the candidate targeting information.

The reference targeting criteria with which the available advertisement request groups (ARG1-ARG7) were defined include only age and location values. Therefore, the analysis subsystem 120 can search the request log for a relevant advertisement request group. In this example, the candidate targeting criteria specify an age of 19 and a location of New York. Although a value for each of the reference targeting criteria are specified by the candidate targeting criteria, there is no advertisement request group defined based on an age of 19. Therefore, the analysis subsystem 120 can select the advertisement request group 404 that only requires a location of New York (e.g., age=∀ and location=New York) as the relevant advertisement request group. In turn, the performance estimate will be computed using advertisement request group 404.

In some implementations, the advertisement request group that is used to compute the performance estimate is the advertisement request group having reference targeting criteria that best match the candidate targeting criteria. For example, assume that another performance estimate request 402 is received including candidate targeting criteria specifying an age of 18 and a location of New York. In this example, the advertisement request group 406 that requires an age value of 18 and a location value of New York would be selected for computing the performance estimate.

When a performance estimate request 402 is received that does not include candidate targeting criteria matching reference targeting criteria required by the advertisement requests groups, the performance estimate can be computed using the advertisement request group 408 that does not require any specific values for either of the reference targeting criteria (e.g., age=∀ and location=∀). For example, if a performance estimate request is received including candidate targeting criteria only specifying a gender of male and an interest of sports, the candidate targeting criteria does not match any reference targeting criteria for any of the advertisement request groups. Therefore, the advertisement request group 408 can be used to compute the performance estimate.

Using the advertisement request group having reference targeting criteria that best match the candidate targeting criteria generally results in a smallest number of advertisement requests being analyzed to provide a performance estimate. Thus, the time required to compute a performance estimate can generally be minimized by using the advertisement request group having reference targeting criteria that best match the candidate targeting criteria.

Once an advertisement request group has been selected, the analysis subsystem 120 can compute the performance estimate based on the advertisement requests included in the selected advertisement request group. In some implementations, the analysis subsystem 120 can analyze each of the advertisement requests in the selected advertisement request group to determine how many of the advertisement requests include request criteria that match all of the candidate targeting criteria.

For example, assume that the candidate targeting criteria specify a gender of male and a location of New York. In this example, the advertisement request group 404 can be used to compute the performance estimates because the candidate targeting criteria specify a value of New York for the location, but no value for age (i.e., age=∀ and location=New York).

Once the advertisement request group 404 is selected, the analysis subsystem 120 can analyze the advertisement requests included in the advertisement request group 404 to compute a performance estimate for the candidate targeting criteria. For example, the analysis subsystem 120 can identify a number of advertisement requests in the advertisement request group 404 that include request criteria specifying that the advertisement request was for a user of male gender. In turn, the analysis subsystem 120 can provide a performance estimate 410 based on the number of advertisement requests in the selected advertisement request group having request criteria that match all of the candidate targeting criteria.

Figure 5:
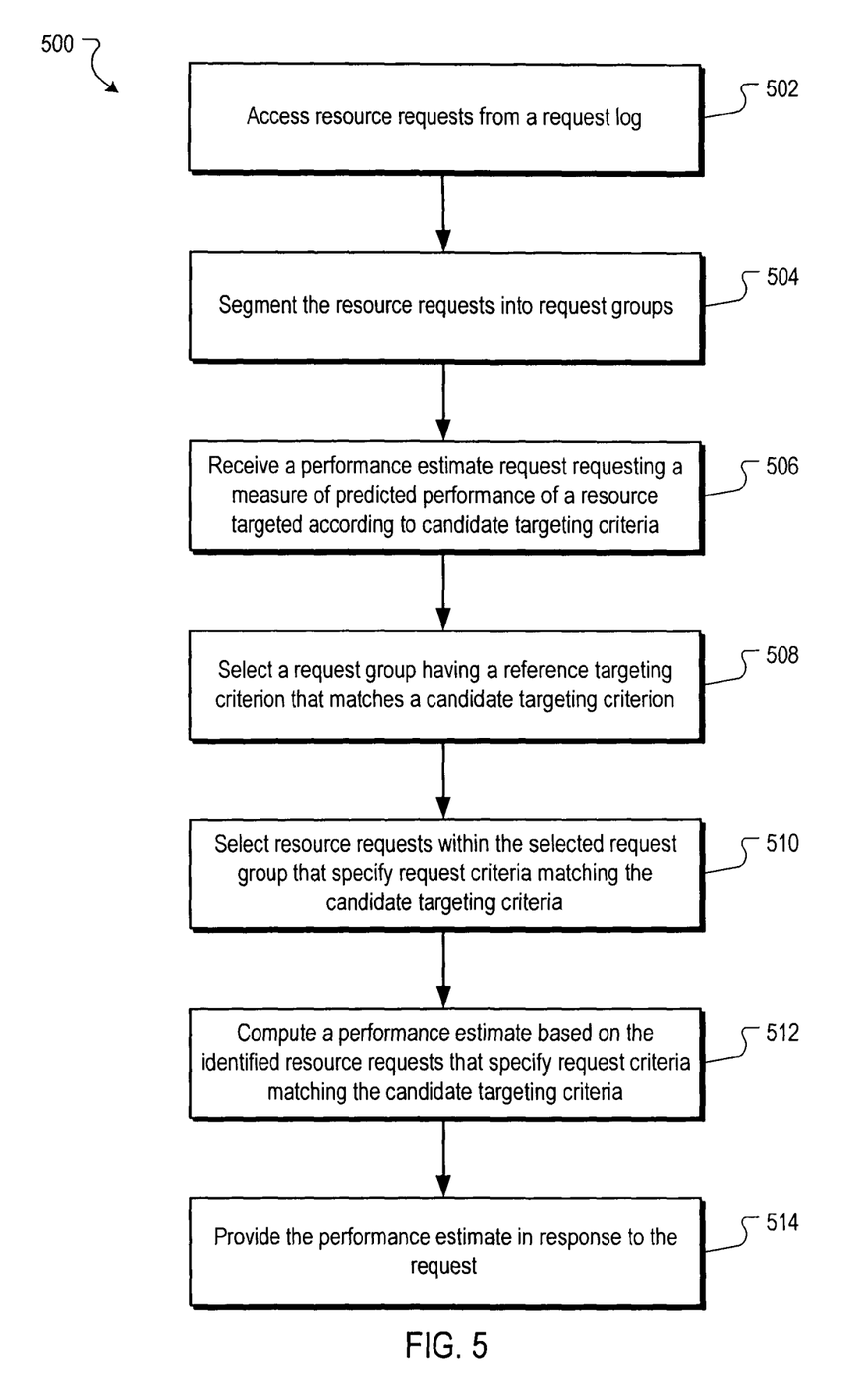
FIG. 5 is a flow chart of an example process for computing a performance estimate based on a relevant advertisement request groups.

FIG. 5 is a flow chart of an example process 500 for computing a performance estimate based on a relevant advertisement request group. In some implementations, the process 500 can be implemented, for example, by the analysis subsystem 120, of FIG. 1. In other implementations, the process 500 can be implemented as instructions encoded on a computer readable medium that when executed cause a data processing device or system to perform operations of the process 500.

The process 500 is a process by which resource requests are segmented into request groups based on request criteria specified by the resource requests and reference targeting criteria for the request groups. Once the request groups are defined, the request groups can be used to compute a performance estimate based on candidate targeting criteria included in a performance estimate request. For example, the performance estimate can be computed based on resource requests that are included in a request group having reference targeting criteria that match the candidate targeting criteria. The performance request is provided in response to the request to complete servicing of the request.

Resource requests are accessed from a request log (502). In some implementations, the resource requests specify request criteria with which targeted resources responsive to the resource request are selected. A resource request is a request for a resource to be provided to a user device. An advertisement request is an example resource request requesting advertisements for presentation to a user device.

The request criteria can include any data with which resources responsive to the resource request can be selected. For example, request criteria for an advertisement request can include user attributes and keywords with which a targeted advertisement can be selected. The resource requests and request criteria can be accessed from a data store that stores previously received resource requests, such as the request log 119 of FIG. 1.

The resource requests are segmented into request groups (504). The segmentation may be based on the request criteria that are specified in the resource requests. In some implementations, each request group requires that each resource request included in the request group specify a request criterion that matches a reference targeting criterion. Advertisement request groups are example request groups that can be used to segment advertisement requests. As described above, advertisement requests can be segmented into advertisement request groups based on request criteria with which targeted advertisements are selected. Resource requests can be segmented into request groups, for example, by the analysis subsystem 120, of FIG. 1. Segmenting resource requests is described in more detail with reference to FIG. 6.

A performance estimate request requesting a measure of predicted performance of a resource targeted according to candidate targeting criteria are received (506). In some implementations, the candidate targeting criteria specify request criteria of resource requests for which the resource is eligible for selection. For example, when the performance estimate request is requesting an advertisement performance estimate, the performance estimate request can include the candidate targeting criteria gender=male, age=18, and location=NewYork. In this example, the candidate targeting criteria specify that the advertisement for which the performance estimate is requested is only eligible to be provided in response to an advertisement request for an 18 year old male user from New York. Thus, a measure of performance being requested may be a measure of how many advertisement requests are received in a month for 18 year old male users from New York. Similarly, the measure of performance can include a number of selections or conversions received by advertisements that are provided according to the candidate targeting criteria.

A request group having a reference targeting criterion that matches a candidate targeting criterion is selected (508). In some implementations, a candidate targeting criterion can match a reference targeting criterion by having a same individual value or a same rage of values as the reference targeting criterion. For example, a reference criterion for age and a candidate targeting criterion for age can specify a single age (e.g., 18) or a range of values (e.g., 18-25). In some implementations, the candidate targeting criterion of age=18 can match either reference targeting criterion (i.e., age=18 or 17<age<26). Similarly, when the candidate and reference targeting criteria specify text, synonyms or other terms that are identified as similar based, for example, on clustering techniques can be identified as matches. Thus, in some implementations, the values specified by the candidate targeting criterion need not be exactly the same as the values specified by the reference targeting criterion for a match to exist.

Resource requests within the selected request group and that specify request criteria matching the candidate targeting criteria are selected (510). In some implementations, each of the resource requests in the selected request group is analyzed to determine whether the request criteria associated with the resource request match the candidate targeting criteria specified in the performance estimate request. In turn, the resource requests having request criteria that match each of the candidate targeting criteria can be selected for computing the performance estimate. As described above, in some implementations, request criteria need not be exactly the same as the candidate targeting criteria for a match to exist.

A performance estimate is computed based on the identified resource requests that specify request criteria matching the candidate targeting criteria (512). In some implementations, the performance estimate is a measure of a number of resource requests that have been received that specify request criteria that match the candidate targeting criteria. The measure can be, for example, a time-based, event-based, or aggregate measure of resource requests. For example, the measure can be a time-based statistical analysis (e.g., average, mean, median, mode, standard deviation, and/or regression analysis) of the resource requests for which a resource including the candidate targeting criteria was responsive over a specified time period.

Additionally, the performance estimate can be based on user actions responsive to a resource provided. For example, the performance estimate can be a click-through-rate or conversion rate of a resource, such as an advertisement. The performance estimate can also be a viewing rate, for example, for online media such as audio or video content.

The performance estimate is provided in response to the request (514). In some implementations, the performance estimate is provided to a device from which the performance estimate request was received. For example, instructions can be provided to an advertiser's device that cause the advertiser's device to display the performance estimate. The performance estimate can be provided, for example, through an advertiser interface provided by an advertisement management system with which the advertiser manages its advertising. The performance estimate can also be provided by e-mail, short message service, or other communication media.

As described above, the performance estimate is computed based on resource requests in a request group having a reference targeting criterion that matches a candidate targeting criterion. In some implementations, the request groups are defined based on reference targeting criteria, as described below.

Figure 6:
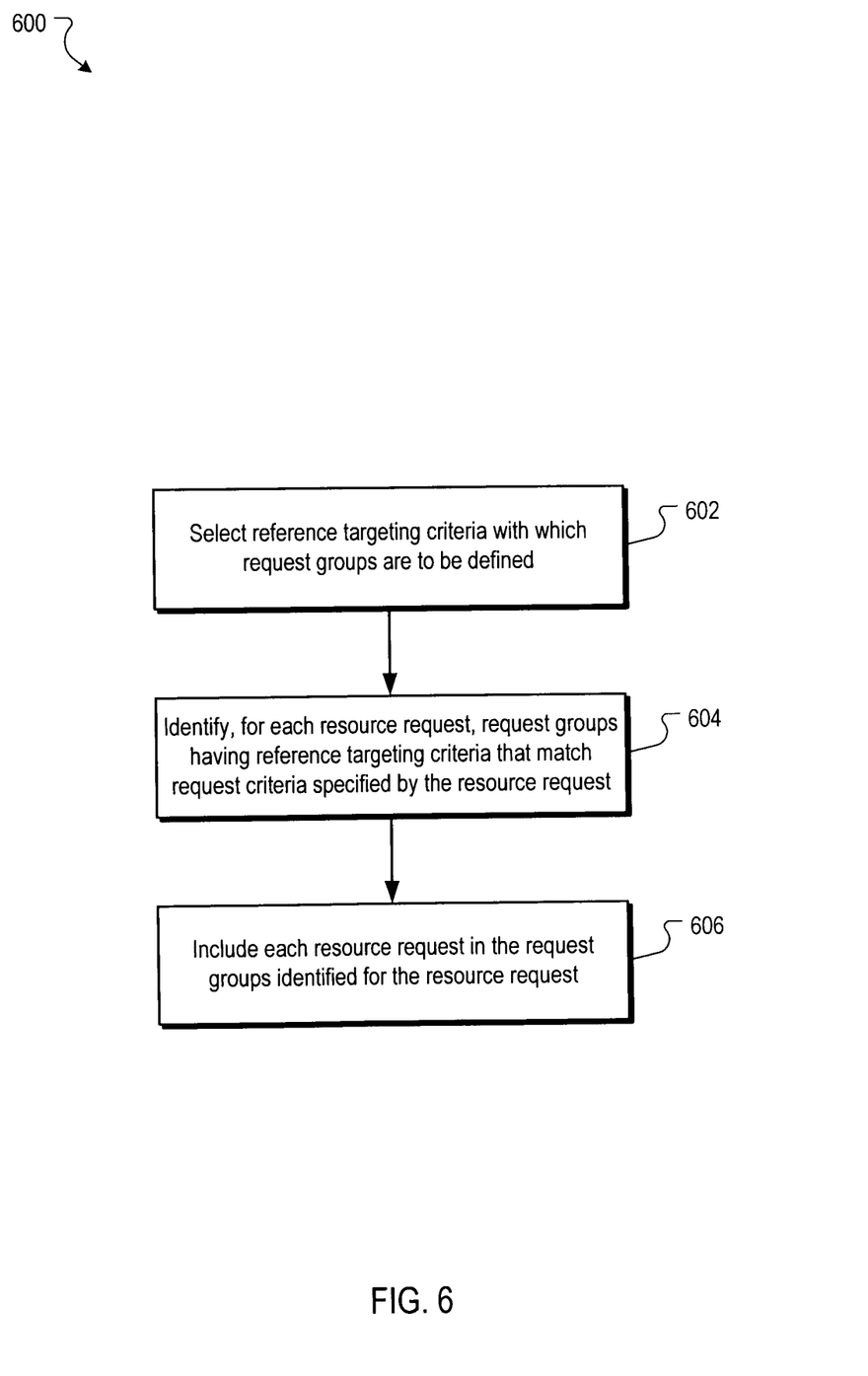
FIG. 6 is a flow chart of an example process for defining advertisement request groups based on reference targeting criteria.

FIG. 6 is a flow chart of an example process 600 for defining request groups based on reference targeting criteria. In some implementations, the process 600 can be implemented, for example, by the analysis subsystem 120 of FIG. 1. In other implementations, the process 600 can be implemented as instructions encoded on a computer readable medium that when executed cause a data processing device or system to perform operations of the process 600.

Performance of the process 600 can begin based on selection of reference targeting criteria with which the request groups are to be defined (602). In some implementations, the selection of reference targeting criteria includes selection of attributes (e.g., topics, categories of demographic attributes, or other user characteristics) with which the resource requests are to be segmented. The attributes can be specified, for example, by an administrator of a system that is providing the performance estimates.

In some implementations, the attributes are selected based on an analysis of the request criteria that are specified by the resource requests. For example, the selected attributes can be attributes with which the resource requests can be segmented according to a specified distribution or attributes with which a threshold number of request groups can be defined. Age is an example of an attribute with which resource requests can be segmented. Age is an attribute that has a continuous range of values and facilitates segmenting resource requests by individual values of age or ranges of values of age. Therefore, age can be used to segment resource requests to achieve a specified distribution of resource requests to request groups.

For example, age ranges can be selected so that each request group includes a threshold number of resource requests (e.g., 100,000 resource requests).

Additionally, attributes can be selected based on a portion of the resource requests including request criteria that specify values for the attributes. For example, the higher the portion of available resource requests that specify a value for the selected attribute, the higher the portion of the resource requests that can be included in request groups based on the attribute.

Once the attributes are selected, values corresponding to the selected attributes that will be used to define the request groups can be specified. The combination of the selected attributes and the corresponding values define the reference targeting criteria for the request groups. For example, as described above, the values for the selected attributes can be specified to achieve specified distributions of resource requests in the request groups or so that a threshold number of request groups are defined.

Request groups having reference targeting criteria that match the request criteria are identified for each resource request. (604). In some implementations, a match between reference targeting criteria and request criteria can require an exact match. In other implementations, ranges or groups of attribute values can be identified as matching the reference targeting criteria such that an exact match is not required.

Each resource request is included in the request groups identified for the resource request (606). In some implementations, a resource request can be limited to being included in only one request group. In other implementations, a resource request can be included in any request group that is identified for the resource request. For example, as described above, an advertisement request specifying a gender value of male, an age value of 18, and a location value of New York can be included in request groups that require each resource request to specify an age value of 18 and a location value of New York, an age value of 18 and any location value, any age value and a location value of New York, and any values for age and location. Once the resource requests are included in their corresponding request groups, the request groups can be made available for computing performance estimates, as described above.

The functional operations described in this specification can be implemented in digital electronic circuitry, or in computer software, firmware, or hardware, including the structures disclosed in this specification and their structural equivalents, or in combinations of one or more of them. The operations also can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may include a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementations can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. For example, the actions recited in the claims can be performed in a different order and still achieve desirable results.

What is claimed is:

1. A computer-implemented method, comprising:
accessing, by one or more processing devices and from a request log, previously received online resource requests that were received at different times and specify request criteria with which targeted resources responsive to the previously received online resource requests were selected for presentation;
selecting, based on a pre-specified response time constraint specifying an amount of time for responding to a performance estimate request after receiving the performance estimate request, a maximum number of the previously received online resource requests that are able to be processed following receipt of the performance estimate request and within the pre-specified response time constraint;
segmenting, by one or more processing devices and based on the specified request criteria, the resource requests into request groups that each include up to the selected maximum number of previously recited online resource requests, each request group having a reference targeting criterion that is shared by each resource request in the group;
receiving, by one or more processing devices, a performance estimate request requesting data specifying a predicted number of impressions that a resource will receive in response to changing a set of targeting criteria used to distribute the resource, the request including at least one changed targeting criterion;
computing, by one or more processing devices, a performance estimate responsive to the performance estimate request, the performance estimate specifying the predicted number of impressions that the resource will receive, the performance estimate being computed based on one of the request groups having a reference targeting criterion that matches the changed targeting criterion;
and providing, by one or more processing devices and in response to the performance estimate request, the performance estimate for the resource when distributed using the changed set of targeting criteria.

2. The method of claim 1, wherein segmenting the resource requests into request groups comprises:
selecting attributes with which the resource requests are to be segmented, each of the attributes corresponding to attribute values specified by the resource requests;
for each attribute, selecting one or more reference targeting criteria with which request groups are to be defined, the one or more reference targeting criteria for each request group specifying one or more attribute values that are required to be specified by resource requests for the resource requests to be included in the request group;
for each resource request,
identifying request groups having reference targeting criteria that match attribute values specified by the resource request; and
including the resource request in the identified request groups.

3. The method of claim 2, wherein computing a performance estimate comprises:
selecting a request group having a reference targeting criterion that matches a candidate targeting criterion specified by the performance estimate request;
selecting, from the selected request group, resource requests having request criteria matching all candidate targeting criteria; and
computing the performance estimate based on the identified resource requests having request criteria matching all of the candidate targeting criteria.

4. The method of claim 1, wherein accessing resource requests comprises accessing advertisement requests, each advertisement request specifying attribute values with which advertisements are selected for presentation to a user device for which the advertisement request was received.

5. The method of claim 4, wherein the attribute values comprise values specifying demographic data for a user for which an advertisement is being selected.

6. The method of claim 1, wherein segmenting the resource requests comprises:
receiving reference targeting criteria with which the resource requests are to be segmented;
identifying, for each resource request, request criteria that match the reference targeting criteria; and including resource requests in a first request group that only requires each resource request in the first request group to have a first request criterion corresponding to a first reference targeting criterion that matches a first group specific targeting value for the first reference targeting criterion.

7. The method of claim 6, further comprising including resource requests in a second request group that requires each resource request in the second request group to have only a second request criterion corresponding to a second reference targeting criterion that matches a second group specific targeting value for the second reference targeting criterion.

8. The method of claim 7, further comprising including resource requests in a third request group that requires each resource request in the third request group to have both the first request criterion and the second request criterion.

9. The method of claim 8, further comprising including resource requests in another request group that does not require the resource requests to have the first request criterion or the second request criterion.

10. A computer-implemented method, comprising:
accessing, by one or more processing devices, previously received online advertisement requests that were received at different times and each specify attribute values with which targeted advertisements responsive to the advertisement requests were selected for presentation;
selecting, based on a pre-specified response time constraint specifying an amount of time for responding to an advertisement performance estimate request after receiving the advertisement performance estimate request, a maximum number of the previously received online advertisement requests that are able to be processed following receipt of the advertisement performance estimate request and within the pre-specified response time constraint;
segmenting, by one or more processing devices, the previously received online advertisement requests to create advertisement request groups that each include up to the selected maximum number of previously received online advertisement requests;
receiving, by one or more processing devices and from an advertiser, an advertisement performance estimate request requesting data specifying a predicted number of impressions that an advertisement will receive by changing a set of targeting criteria used to distribute the advertisement based on a set of candidate targeting criteria specified in the request;
selecting, by one or more processing devices, one or more relevant advertisement request groups, each of the one or more relevant advertisement request groups being an advertisement request group having a reference targeting criterion that matches a candidate targeting criterion in the set of candidate targeting criteria;
computing, by one or more processing devices, an advertisement performance estimate based on the advertisement requests in the one or more relevant advertisement request groups, the advertisement performance estimate specifying the predicted number of impressions that the advertisement will receive, the advertisement performance estimate being computed based on advertisement requests in the one or more relevant advertisement request groups having attribute values that match all of the candidate targeting criteria in the set of candidate targeting criteria; and
providing, by one or more processing devices, the advertisement performance estimate to the advertiser.

11. The method of claim 10, wherein selecting the one or more relevant advertisement request groups comprises selecting only the relevant advertisement request groups having a maximum number of targeting criterion that match the candidate targeting criteria.

12. A system, comprising:
a data store storing previously received online resource requests that were received at different times and specify request criteria with which targeted resources responsive to the previously received online resource requests were selected for presentation;
and an analysis apparatus coupled to the data store, the analysis apparatus including at least one processor configured to:
select, based on a pre-specified response time constraint specifying an amount of time for responding to a performance estimate request after receiving the performance estimate request, a maximum number of the previously recited online resource requests that are able to be processed following receipt of the performance estimate request and within the pre-specified response time constraint;
segment, based on one or more reference targeting criteria, the resource requests into request groups each including up to the selected maximum number of previously received online resource requests;
receive an performance estimate request requesting data specifying a predicted number of impressions that a resource will receive in response to changing a set of targeting criteria used to distribute the resource;
select, based on a candidate targeting criterion including in the performance estimate request, a relevant request group from the request groups;
computer, based on the relevant request group and in response to the performance estimate request, a performance estimate specifying a predicted number of impressions that the resource will receive when distributed based on a different set of targeting criteria that includes the candidate targeting criterion;
and provide, in response to the performance estimate request, the performance estimate for the resource when distributed using the different set of targeting criteria.

13. The system of claim 12, wherein the analysis apparatus is further configured to store the request groups in the data store and update the request groups in response to new resource requests being identified.

14. The system of claim 12, wherein the analysis apparatus is further configured to determine that a resource request has a first request criterion that matches a first group reference criterion for a first request group and include the resource request in the first request group based on the determination, the first request group requiring only that each resource request in the first request group have the first request criterion.

15. The system of claim 14, wherein the analysis apparatus is further configured to determine that the resource request has a second request criterion that matches a second group reference criterion for a second request group and include the resource request in the second request group based on the determination, the second request group requiring only that each resource request in the second request group have the second request criterion.

16. The system of claim 15, wherein the analysis apparatus is further configured to include the resource request in a third request group that requires each resource request in the third request group to have both the first request criterion and the second request criterion.

17. The system of claim 12, wherein the analysis apparatus is further configured to compute the performance estimate based on relevant resource requests from the relevant request group, the relevant resource requests being resource requests having attribute values that match each of the candidate targeting criterion.

18. A non-transitory computer storage medium encoded with a computer program, the program comprising instructions that when executed by one or more data processing apparatus cause the one or more data processing apparatus to perform operations comprising:

accessing previously received online advertisement requests that were received at different times and each specify attribute values with which targeted advertisements responsive to the advertisement requests were selected for presentation;

selecting, based on a pre-specified response time constraint specifying an amount of time for responding to an advertisement performance estimate request after receiving the advertisement performance estimate request, a maximum number of the previously received online advertisement requests that are able to be processed following receipt of the advertisement performance estimate request and within the pre-specified response time constraint;

segmenting the previously received online advertisement requests to create advertisement request groups that each include up to the selected maximum number of previously received online advertisement requests;

receiving, from an advertiser, an advertisement performance estimate request requesting data specifying a predicted number of impressions that an advertisement will receive by changing a set of targeting criteria used to distribute the advertisement based on a set of candidate targeting criteria specified in the request;

selecting one or more relevant advertisement request groups, each of the one or more relevant advertisement request groups being an advertisement request group having a reference targeting criterion that matches a candidate targeting criterion in the set of candidate targeting criteria;

computing an advertisement performance estimate based on the advertisement requests in the one or more relevant advertisement request groups, the advertisement performance estimate specifying the predicted number of impressions that the advertisement will receive, the advertisement performance estimate being computed based on advertisement requests in the one or more relevant advertisement request groups having attribute values that match all of the candidate targeting criteria in the set of candidate targeting criteria; and providing the advertisement performance estimate to the advertiser.

* * * * *